UNITED STATES PATENT OFFICE.

WILLIAM F. NILES, OF LEOMINSTER, MASSACHUSETTS.

IMPROVEMENT IN PROCESSES OF MANUFACTURING ARTICLES FROM HORN AND HOOF.

Specification forming part of Letters Patent No. 166,475, dated August 10, 1875; application filed February 26, 1875.

*To all whom it may concern:*

Be it known that I, WILLIAM F. NILES, of Leominster, in the county of Worcester and Commonwealth of Massachusetts, have made certain new and useful Improvements in the Mode or Process of Manufacturing Articles from Horn and Hoof; and I do hereby declare that the following is a full, clear, and exact description of the same.

To enable those skilled in the art to which my invention belongs to make and use the same, I will proceed to describe it more in detail.

The horn or hoof is first ground to a fine powder by means of emery-wheels, and this part of the process may be accomplished by placing the horn or hoof in a hopper, and pressing the hoof out through the hopper against the periphery of the revolving wheels, and the pressure against the horn or hoof may be produced by a weight, spring, or by the hand, or in any other manner which will accomplish the desired result. After the horn or hoof has thus been reduced to a powder, bone-black is mixed with it in about the proportion of one pound to about fifteen pounds of powdered hoof or horn, and water is sprinkled upon the mixture in the proportion of about one-twentieth by weight, after which the slightly-moistened mixture of powdered horn or hoof is sifted or bolted through fine meshes formed of wire, and by which operation the bone-black is evenly and perfectly mixed with the powdered horn or hoof, while at the same time all the scaly or brand part of the horn or hoof is separated from the fine flour or powdered part, together with all the particles of emery and other foreign substance of injurious size; the larger particles of emery, as the substance is sifted and shaken together, serving to knock the fine powdered particles of horn or hoof from the scaly parts, and to mix them thoroughly with the bone-black. The mixture is now placed in suitable quantities in proper dies to give the desired forms and shapes to the articles to be made, and the material subjected to great pressure, the dies being subjected to heat during the pressing operation, and which, for small articles, continues from four to eight minutes, and for larger articles the time is increased in proportion to the size of the article.

I have found that by placing the dies between hollow beds and platens filled with steam, a very successful result is obtained.

It may be remarked that the presser, for general work, should be made strong enough to stand a pressure strain of about twenty tons.

After the articles are removed from the press they are turned (when necessary) and polished and buffed to give them the desired finished appearance.

When dies are used over and over again in quick succession, they should, after the removal of each set of articles, be reduced in temperature to about blood heat before being refilled; otherwise a very serious and injurious effect will result—viz., the cracking, checking, or scaling of the articles in a short time after the articles have been finished. This is owing to the articles being hardened upon their center surface before the pressure is applied.

In making articles from hoof or horn by the above improved mode or process, I am able to produce articles in a much more expeditious, cheap, and perfect manner than by the process previously patented by me. By mixing the bone-black with the unsifted ground horn or hoof, and sifting them together in a comparatively dry state, I obtain a thorough mixture of a coloring substance with the powdered hoof or horn, whereby the articles are colored in the most perfect manner, and that, too, without the use of water, as required in the practice of my former patented mode or process. Another great advantage and saving resulting from my present mode or process is due to the fact that the gelatine contained in the ground horn or hoof is not dissolved and wasted, which is found to be the case when ground hoof or horn is mixed with water, as required in making articles according to my said patented process. Then, again, a great loss results by the use of a liquid coloring matter, as provided for in my said patented process. Still, again, by my present mode or process, the curing or baking process required to be pursued in my said patented process is also obviated, since the articles, as soon as they come from the pressing-dies, are ready to be finished at once for the market.

Bone-black used as above described, in combination with ground hoof or horn, produces articles of great hardness, and susceptible of a very high polish.

The slight moisture absorbed by the mixture before it is sifted or bolted is given out when heat is applied to the dies containing the articles, and, uniting with the gelatine, produces a uniting substance which binds the particles of ground hoof or horn firmly together under the combined action of heat and pressure, as above described.

I wish to be distinctly understood as disclaiming the art of treating horn, hoof, or tortoise-shell by reducing it to a finely-powdered state, and reconverting it to a solid body resembling its natural state by heat and pressure.

Having described my invention or improvements, what I claim therein as new and of my invention, and desire to secure by Letters Patent, is—

1. The herein-described improved mode or process of making or forming articles from horn or hoof and bone-black, which consists in reducing the horn or hoof to powder by grinding, mixing with the same bone-black, as described, bolting or sifting said mixture slightly moistened, as described, and then pressing the bolted or sifted product in heated dies or molds of the configuration required for the article to be produced.

2. Articles made from ground hoof or horn and bone-black, combined together substantially in the manner described.

WILLIAM F. NILES.

Witnesses:
 THOS. H. DODGE,
 EDWIN E. MOORE.